(12) United States Patent
Jones et al.

(10) Patent No.: US 9,536,453 B2
(45) Date of Patent: Jan. 3, 2017

(54) COMPUTER-IMPLEMENTED COMMUNICATION ASSISTANT FOR THE HEARING-IMPAIRED

(71) Applicants: Michael D. Jones, Orem, UT (US); Eric Hintz, Orem, UT (US); Margaret J. Lawler, Orem, UT (US)

(72) Inventors: Michael D. Jones, Orem, UT (US); Eric Hintz, Orem, UT (US); Margaret J. Lawler, Orem, UT (US)

(73) Assignee: BRIGHAM YOUNG UNIVERSITY, Provo, UT (US)

( * ) Notice: Subject to any disclaimer, the term of this patent is extended or adjusted under 35 U.S.C. 154(b) by 22 days.

(21) Appl. No.: 14/256,305

(22) Filed: Apr. 18, 2014

(65) Prior Publication Data

US 2014/0329208 A1 Nov. 6, 2014

Related U.S. Application Data

(60) Provisional application No. 61/819,034, filed on May 3, 2013.

(51) Int. Cl.
*G09B 21/00* (2006.01)
(52) U.S. Cl.
CPC .................................. *G09B 21/009* (2013.01)
(58) Field of Classification Search
CPC ........ G09B 21/00; G09B 21/009; G09B 21/04
USPC ......................................................... 434/169
See application file for complete search history.

(56) References Cited

U.S. PATENT DOCUMENTS

| 8,183,997 | B1 | 5/2012 | Wong et al. |
| 8,566,075 | B1* | 10/2013 | Bruner ............................. 704/2 |
| 2003/0174160 | A1* | 9/2003 | Deutscher et al. ........... 345/716 |
| 2006/0074624 | A1* | 4/2006 | Sahashi ............................. 704/8 |
| 2006/0174315 | A1* | 8/2006 | Kim et al. .................... 725/136 |
| 2008/0144781 | A1* | 6/2008 | Liebermann et al. .......... 379/52 |
| 2011/0157472 | A1* | 6/2011 | Keskinen ...................... 348/564 |
| 2012/0057078 | A1* | 3/2012 | Fincham .................. H04N 5/57 348/645 |
| 2012/0078628 | A1 | 3/2012 | Ghulman |
| 2014/0063055 | A1* | 3/2014 | Osterhout et al. ............ 345/633 |

OTHER PUBLICATIONS

Kercher, Kellie. "Improving the Learning Experience for the Deaf through Augment Reality Innovations." Proceedings of the 2012 18th International Conference on Engineering, Technology and Innovation. Jun. 18-20, 2012. 11 pages.

* cited by examiner

*Primary Examiner* — Xuan Thai
*Assistant Examiner* — Kristen Shirley
(74) *Attorney, Agent, or Firm* — Workman Nydegger

(57) ABSTRACT

Computing systems are provided for facilitating communication to the hearing-impaired. The computing systems obtain and modify a video that includes a signer performing sign language about a topic. The video is then modified and presented to a viewer in such a way that the viewer can simultaneously view the sign language and the one or more objects corresponding to the topic. In some instances, the modified video is blended with another video corresponding to the same topic so as to enable a user to view the sign language at the same time as the corresponding video presentation. This can be done in real-time or with a time delay. In other instances, the modified video is rendered on a display through which the user is also viewing the one or more related items associated with the sign language.

20 Claims, 4 Drawing Sheets

COMPUTER-IMPLEMENTED COMMUNICATION ASSISTANT FOR THE HEARING-IMPAIRED

CROSS-REFERENCE TO RELATED APPLICATIONS

This application claims the benefit of and priority to U.S. Provisional Patent Application Ser. No. 61/819,034 filed on May 3, 2013 and entitled "COMPUTER-IMPLEMENTED COMMUNICATION ASSISTANT FOR THE HEARING-IMPAIRED," which application is expressly incorporated herein by reference in its entirety.

BACKGROUND OF THE INVENTION

Various systems and approaches have been designed to facilitate communications to the hearing-impaired, including the use of sign language. Sign language can be provided by signers giving a presentation, as well as interpreters who relay information that is spoken during a presentation. Signers and interpreters are practical because they are very portable and do not require sophisticated equipment. Unfortunately, however, because sign language is a visual language, the hearing-impaired can miss important visual material and cues from the presentation when they are focusing on the signer or interpreter.

The foregoing problem is exacerbated in certain settings like museums or planetariums where the referenced objects that are positioned far away from the signer. In such situations, the presentation will be paused, repeatedly, to allow the spectators to focus their attention back and forth between the signer and the referenced objects. Unfortunately, such delays often result in an overall degraded experience and challenging environment for learning.

Some hearing-impaired viewers can benefit from the use of closed captioning for video presentations. However, young children who are unable to read or process the closed captioning do not realize the same benefits. Closed captioning can also be very distracting and undesirable for those that are not hearing-impaired.

BRIEF SUMMARY OF THE INVENTION

Computing systems are provided for facilitating communication to the hearing-impaired. The computing systems obtain and modify a video of sign language given for a particular topic. The modified video is then presented in real-time or with a time delay as part of a presentation of related material to the hearing-impaired.

In some instances, the modified video is blended with another video that also corresponds to the same topic, so as to enable the viewer to observe the sign language at the same time as the corresponding video presentation. Preferably, the blending of the videos is synchronized so that the sign language from the first video is presented contemporaneously with the corresponding spoken words from the second video.

In some instances, the modified video is rendered as an overlay to visually perceptible objects. For instance, in one embodiment, the modified video is rendered on a transparent glass through which the viewer is also viewing the one or more related items associated with the sign language.

The video selection and video modification correspond specifically to the one or more items being viewed by the viewer and can be performed in any suitable manner to provide the desired visual accommodation to the hearing-impaired.

Various training mechanisms can also be employed to ensure that the video is modified and rendered in a preferred format. Likewise, controls can also be utilized during the display of the modified video to provide for customization over the manner in which the video is modified and/or displayed.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

As described throughout this paper, various techniques are used for facilitating communications to the hearing impaired. The embodiments of the invention include methods and corresponding systems and computer program products that are configured to enable or to implement the methods of the invention.

While embodiments of the invention include visual accommodations that are particularly well-suited for the benefit of the deaf and hearing-impaired, it will be appreciated that the scope of the invention is not limited to applications for any particular classification of persons. To the contrary, the scope of the invention also applies to the implementation of the disclosed embodiments for the hearing-capable.

Attention will now be directed to the figures, which illustrate some of the embodiments of the invention.

Figure 1:
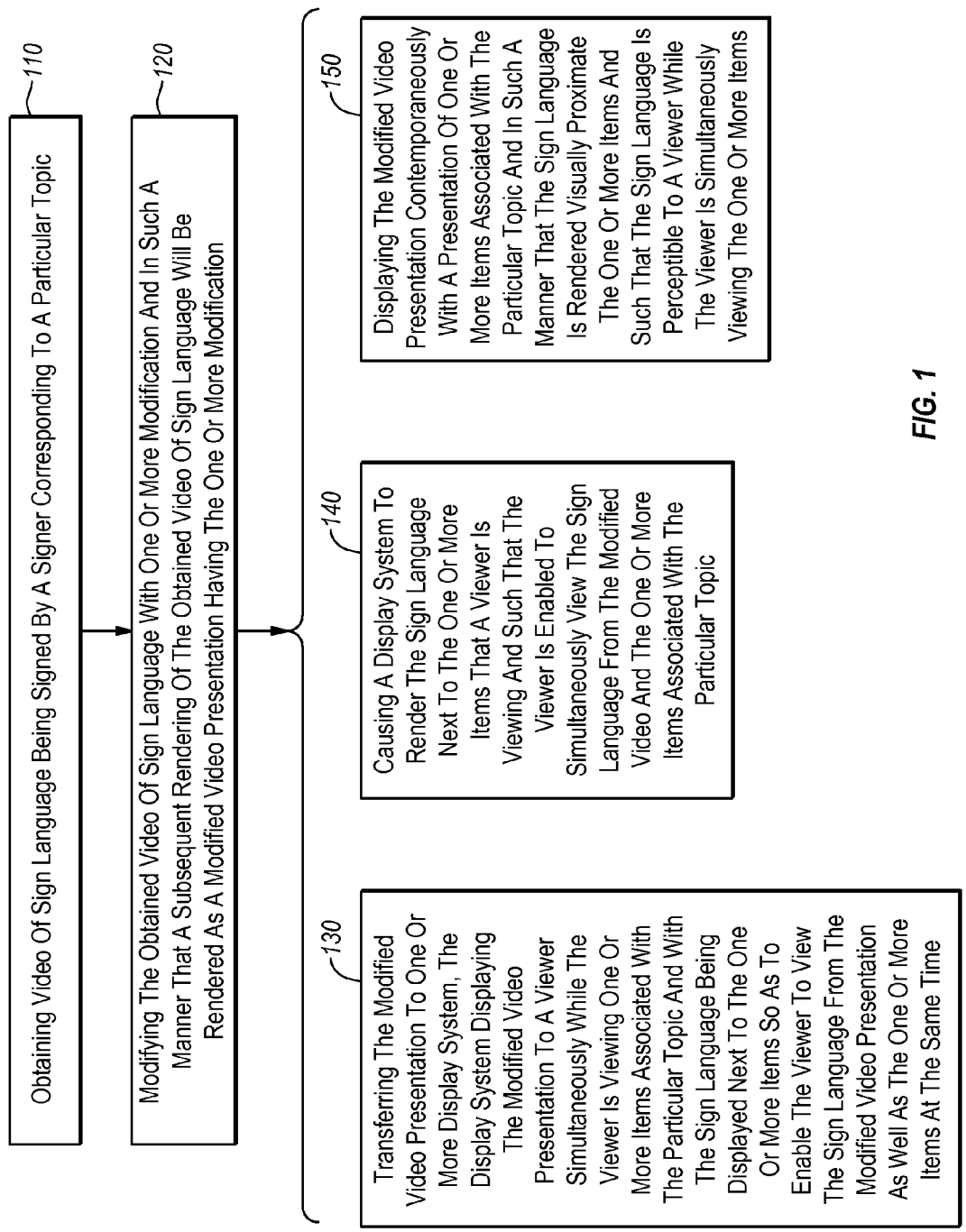
FIG. 1 illustrates a flowchart that includes various acts that can be performed for facilitating communications to the hearing-impaired.

FIG. 1, for instance, illustrates a flowchart that includes various acts that can be performed for facilitating communications to the hearing-impaired, or hearing-capable.

As indicated, the flowchart includes a first act (110) of obtaining video of sign language that is being signed by a signer corresponding to a particular topic. Preferably, the sign language in the video will correspond directly to the particular concepts and words that are conveyed in a presentation that a viewer is watching or that relate to one or more objects that the viewer is looking at.

Figure 2:
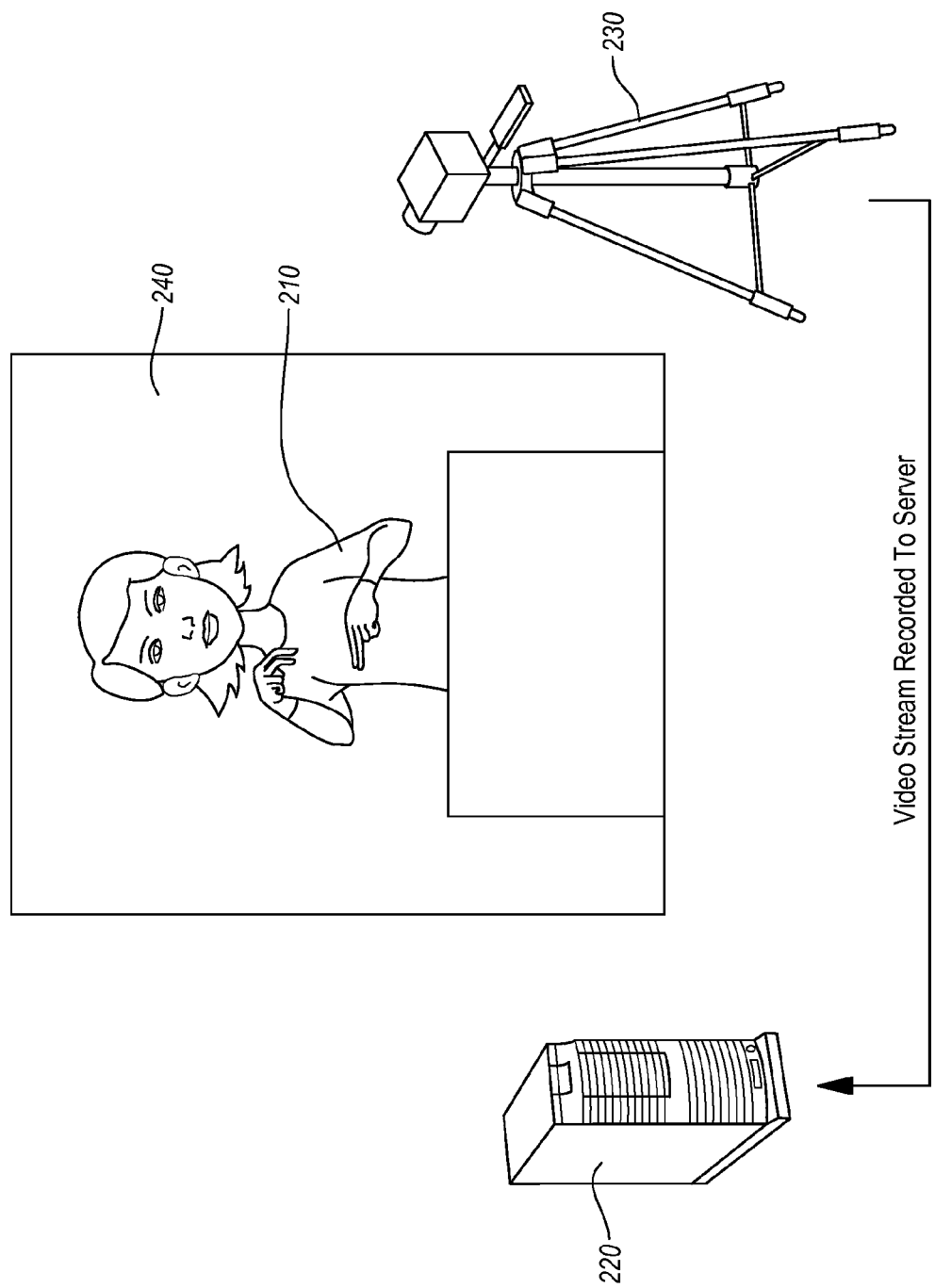
FIG. 2 illustrates an interpreter being recorded while providing sign language corresponding to a particular topic.

The video of the sign language can be performed in many different ways. In one example, shown in FIG. 2, an interpreter 210 can be filmed and the filming can be recorded in a digital or other format suitable for storage such as, for example, a computer server 220. In this regard, it will be noted that the computer server 220 can comprise a single stand-alone computer or a distributed computing system. Likewise, the server storage can also be stored on the camera 230 or other filming device, or any combination of the foregoing devices and systems.

The filming of the video can be performed, in some instances, with the interpreter 210 standing in front of a simple colored background 240 (e.g., a green screen or another type of background) that can help facilitate editing of the video, such as cropping the video to the interpreter by removing the background. The use of a simple background 240 can also be beneficial when the background persists, to minimize the amount of visual noise and distracting elements presented to the viewer. This can be beneficial for helping the viewer focus on the interpreter 210.

While the video of the sign language can be obtained from a live interpreter or signer, it will also be appreciated that the video of the sign language can be obtained by creating and/or accessing an animation that is simulated by computers. Software for creating computer animations is well-known to those of skill in the art.

In some embodiments, the video of the sign language is a pre-recorded video. In other embodiments, the video of the sign language is a live streaming video.

Upon obtaining the video of the sign language (110), the methods of the invention also include the modifying of the video with one or more modifications and in such a manner that the subsequent rendering of the video will be rendered as a modified video presentation that visually reflects the one or more modifications (120). In this regard, the modifications made to the video are distinguished from typical storage/transmission/rendering modifications such as compressing, multiplexing, de-multiplexing, reformatting, resizing for screen size constraints, and so forth. Even more particularly, the modifications to the video comprise modifications that are only applied to selected portions of the video without applying similar modifications to other portions of the video.

The modifications to the video (120) can include, for instance, cropping or otherwise isolating the interpreter 210 from the background 240, such that at least a portion of the background is removed from the video. The cropping/isolating of the interpreter 210 can also include cropping/isolating only selective portions of the interpreter, such as, for example, the hands, face, torso and so forth.

The modifications to the video can also include any combination of repositioning, resizing, coloring, re-coloring, brightening, sharpening, blurring, blending, masking, applying transparency settings, marking, annotating, adding background graphical elements, and so forth, to the interpreter 210 or other selective elements in the video. By way of example, the interpreter's hands can be highlighted or remain visible, while the rest of the interpreter 210 is cropped out or displayed with reduced visibility. To facilitate this process, the interpreter may wear gloves of a particular color or material that is easily detectable, or that incorporates the use of specialized animation technologies (e.g., clothing with embedded visibility sensors or motion detecting electronic sensors).

In some embodiments, the modifications are made only to the cropped/isolated interpreter elements.

With specific regard to the modifications made to videos composed of computer generated animations, the acts associated with modifying the obtained video can include or be limited to the generation of the animation(s).

The modifications can be performed in real-time, while streaming the video that is being filmed. Alternatively, the modifications can be performed to one or more pre-recorded copies of the video.

The modifications can be performed by a single system or by a plurality of different systems, including, but not limited to the recording systems, storage systems, transmission systems and display systems.

In some embodiments, the modifications occur prior to storing or transferring the video to a display system for display. In other embodiments, the modifications occur subsequent to storing the video in a persistent storage or subsequent to transmitting the video to the display system.

The modifications can be predefined and consistently applied to a plurality of videos or video segments. Alternatively, or additionally, the modifications can be customized and dynamically adjusted for a particular video or video segment according to input received from a viewer(s).

For instance, a viewer can utilize controls that are connected to the display system, storage system or recording system that cause the modifications to be adjusted to accommodate a desired preference or need. By way of example, a viewer can provide input for adjusting the size, brightness, transparency, positioning, coloring, highlighting or other formatting of interpreter relative to other objects/elements being viewed by the viewer directly at the display device or with a controller connected to the display device. The controls can also provide trick play functionality (e.g., fast forward, rewind, skip, pause, and so forth).

Environmental conditions can also be detected by the display system or another related/connected system and used to automatically make modifications to the video. For instance, the ambient lighting, background coloring, time of day or other conditions can be detected and used to control the brightness, coloring, transparency, marking, highlighting and/or other modifications to further enhance the visual accommodations.

An administrator can also provide input, at the server level, for setting the modifications based on a perceived preference or need, such as, for example, based on feedback received from participants utilizing the systems of the invention and/or based on the costs associated with the modification(s).

When there are many different video recordings having similar sign language being provided by different interpreters, the modifications and user controls can also include replacing or selecting one interpreter over another.

Once modified, the modified video is either transferred to and/or rendered at a display system, depending on where the modifications occurred and whether the system is a distributed system or a consolidated system.

Various acts can be performed for causing the modified video to be rendered in such a way that the sign language from the video is rendered simultaneously with and next to the one or more objects being viewed by the participant viewing the sign language. For instance, as reflected in FIG. 1, the methods of the invention can include acts 130, 140 and 150.

Act 130 corresponds to transferring the modified video presentation to one or more display system, the display system displaying the modified video presentation to a viewer simultaneously while the viewer is viewing one or more items associated with the particular topic and with the sign language being displayed next to the one or more items so as to enable the viewer to view the sign language from the modified video presentation as well as the one or more items at the same time.

Act 140 corresponds to causing a display system to render at least the sign language from the modified video presentation to be rendered near the one or more items that the viewer is viewing and such that the viewer is enabled to simultaneously view the sign language from the modified video and the one or more items associated with the particular topic.

Act 150 corresponds to displaying the modified video presentation contemporaneously with a presentation of one or more items associated with the particular topic and in such a manner that the sign language is rendered visually proximate the one or more items and such that the sign language is perceptible to a viewer while the viewer is simultaneously viewing the one or more items.

The foregoing acts can include blending the modified video with another video presentation into a single blended video presentation. In these situations, the blended video preferably synchronizes the sign language from the modified video with the spoken words or concepts conveyed by the second video presentation.

The blended presentation can be rendered in substantially real-time while the video is obtained and such that the modifying and blending are performed on-the-fly, as the video is filmed. Alternatively, the blending can be performed on a pre-recorded video. In this regard, it is also noted that the blending can also occur prior to or during the actual rendering process.

In other embodiments, the acts associated with rendering the modified video are performed without blending videos. Instead, the modified video is presented as a visual overlay on a transparent glass or an opaque display which occludes or partially occludes one eye. The display is visible to the viewer at the same time the viewer is viewing one or more related objects through the transparent glass or using the non-occluded eye. For instance, augmented reality screens can be used to provide such an overlay. Augmented reality devices are known to those of skill in the art. These devices include, but are not limited to the following devices: Brother Airscouter, Liteye, VRealities VR-1, Intevac I-Port EX3, Lumus Video Eyeglasses, VRealities Z800 Pro AR, I-Port Universal, Vrealities I-Port, Vuzix Tac-Eye LT, Laster Pro Mobile Display, VRealities VR Pro WUXGA, Vuzix Wrap 920AR, Epson Moverio, Google Glass, and Laster Smart-Vision.

Selection of the device to use for displaying the modified video can include various considerations to accommodate the needs and preferences of the viewer, such as cost, durability, aesthetics, eyestrain, comfort, interference with hearing aids, wireless streaming capabilities, and so forth.

In some embodiments, the methods of the invention also include detecting focus information related to the location and orientation of the display system. The focus information can be used, for example, to extrapolate or otherwise determine which item(s) the viewer is looking at.

The focus information can be based on a specific GPS location or a relative location to a particular object. The focus information can also include horizontal and vertical orientation of the display device, including tilt. In some instances, the focus information also includes acceleration information. For instance, when the display device is a pair of augmented reality glasses, the system can identify the one or more objects that the AR glasses are oriented towards and/or moving towards.

When the AR glasses or other system is oriented towards multiple different items, the methods of the invention can also include applying probabilistic algorithms to determine which of the items the viewer is most likely focused on. For instance, when a viewer is in a museum, the methods of the invention will determine that the viewer is looking at a statue in the same general area of the room rather than a remote area of the room.

The viewer can also be provided controls on the display system or a related system for selectively switching the determined focus of the system. An icon or other marker can be provided to enable a viewer to more intuitively know which item is currently the determined focus of the system.

Other techniques for determining the focus information can include analyzing the retinal position and focus of the viewer. The display system or another system can be used to detect the focus information.

At least some embodiments also utilize voice recognition software to detect voice commands and conversations. These embodiments also use analysis software that is capable of identifying a context of the conversations and voice commands. Context information can also be obtained by interpreting commands that are given by a viewer blinking, the viewer moving their head or proving other facial gestures, tapping the device, and so forth. The context information is used in combination with the focus information to help extrapolate the object(s) that are being looked at.

Once the focus of the system is determined, based at least in part on the focus information, the methods of the invention also include selecting the video or video segment which is most applicable to the focus information, such as, for example, video containing recorded sign language that is contextually relevant to the object(s) being looked at. By way of example, when the viewer looks at a statue, the viewer can be presented with an augmented reality overlay of an interpreter signing about the statue, rather than a video having sign language corresponding to a picture that is in the same room. Then, when the viewer looks to another item, the overlay video will be switched to a different video with recorded signing about the other item. Similarly, in a planetarium, the system can detect which celestial object the viewer is looking at within the presentation and provide correspondingly relevant video of sign language that is rendered proximate that object. Or, which will at least be perceived by the observer as being located proximate the object. For example, FIG. 4 demonstrates viewer 420*a* looking at presentation object 442*a* with the appropriate sign language video 444*a*/444*b* being rendered and visible to viewer 420*a*, with the sign language video 444*a*/444*b* being rendered simultaneously with and displayed proximate to object 442*a*. Similarly, viewer 420*b* is able to view and perceive presentation object 442*b* at the same time that the sign language video 444*a*/444*b* is displayed next to object 442*b*. It will be appreciated that the sign language video 444*a* and 444*b* can be the same sign language video or different sign language videos that have been modified to accommodate the specific preferences or needs of the viewers (420*a* and 420*b*, respectively). For instance, one video 444*b* may have special highlighting or cropping that is different than the highlighting or cropping of the other video 444*a*.

The focus information can also be used, in some embodiments, to ensure that the modified video is not presented directly on top of the object(s) being looked at. Instead, the detected focus information can be used to determine an appropriate location next to the object(s) where the video of the sign language should be presented. In some embodiments, the positioning is immediately proximate the corresponding object(s), within a few inches, for example. In other embodiments, the positioning is a little more distant, such as a few feet. In yet other embodiments, the positioning of the video does overlap with the object(s) being focused on, either partially or entirely. Preferably, however, when the video does overlap the viewed object(s), the transparency of the video is adjusted to enable the viewer to still see the object(s) without having the object fully obscured by the overlapping video.

Figure 3:
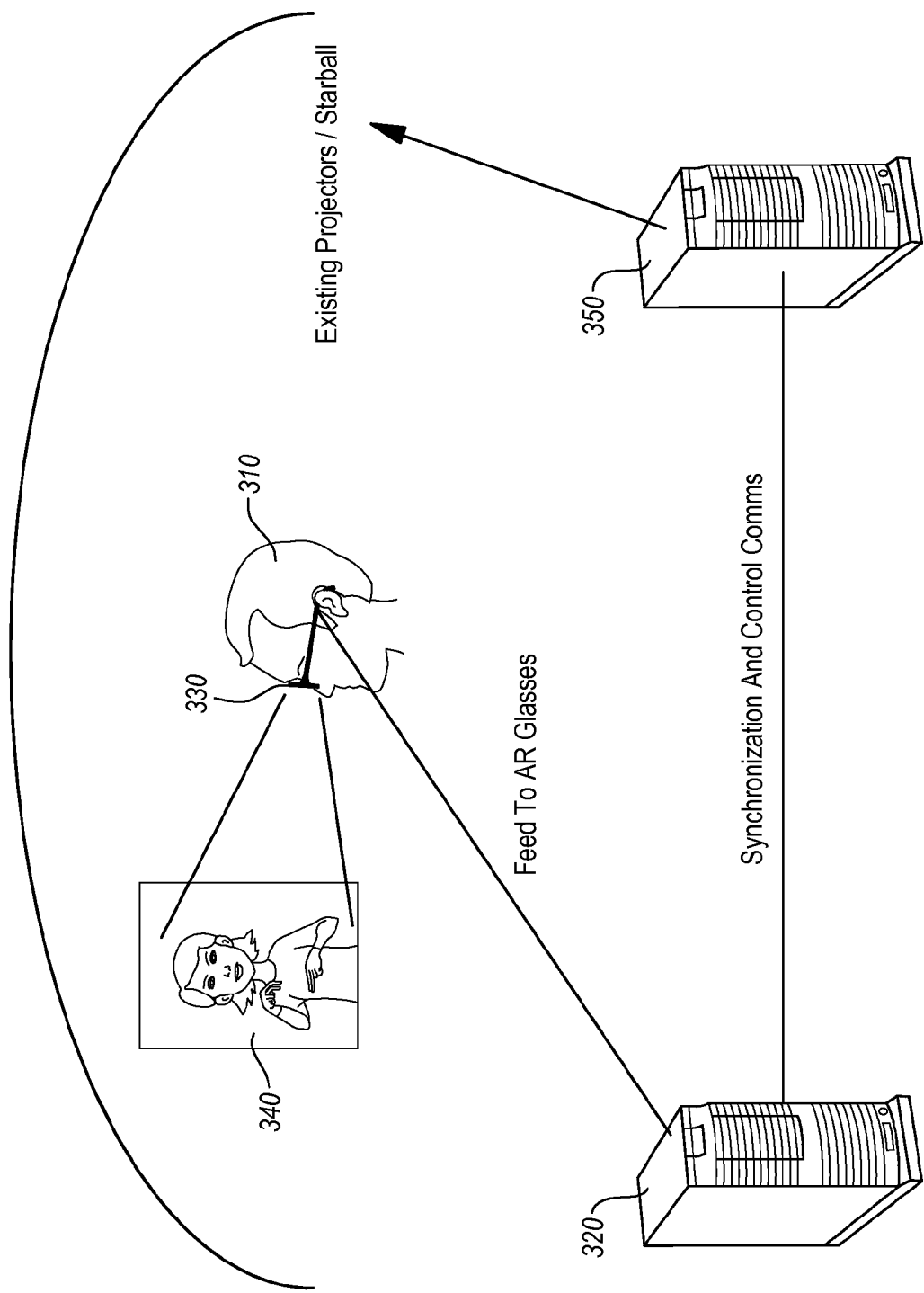
FIG. 3 illustrates a system in which a viewer is wearing head gear comprising glasses that are rendering recorded sign language that is synchronized with other presentation materials.
Figure 4:
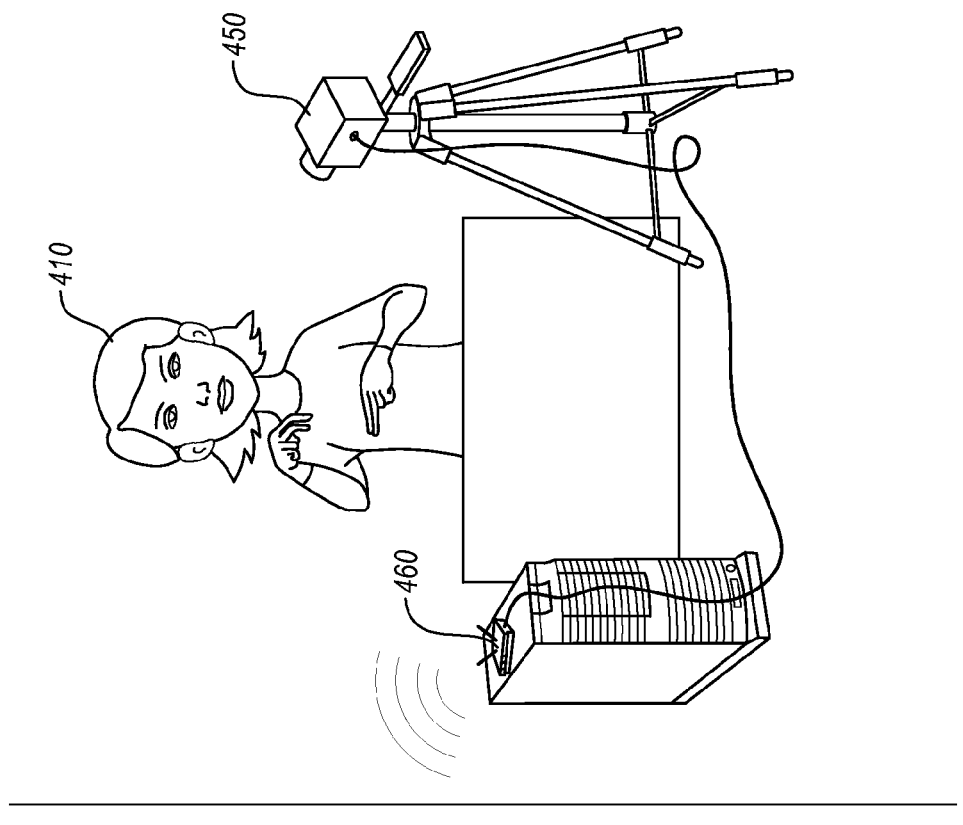
FIG. 4 illustrates an interpreter providing sign language corresponding to a presentation and a plurality of viewers viewing the presentation wherein two of the viewers are wearing glasses that enable them to view the sign language while also watching the presentation.
Figure 4:
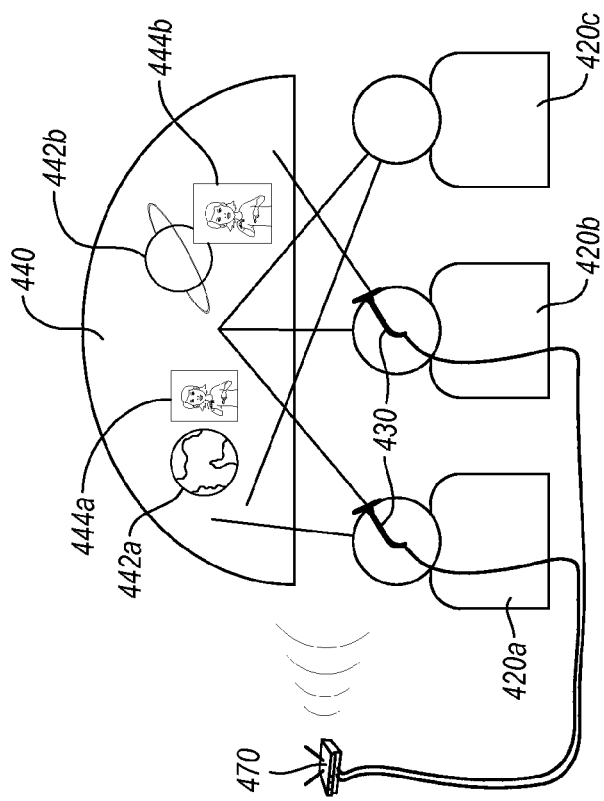

FIGS. 3 and 4 show two non-limiting examples for presenting modified video of sign language corresponding to and rendered proximate the object(s) being signed about.

In FIG. 3 a viewer 310 is wearing augmented reality glasses 330 which are receiving and displaying a modified video 340 of an interpreter. The viewer 310 perceives the signing video 340 to be displayed proximate the corresponding presentation and/or object(s) that the viewer is also looking at through the transparent or semi-transparent glasses. It is noted, in this regard, that the image 340 of the interpreter is not actually projected into space, but rather perceived to be positioned in space proximate the other object(s) the viewer is looking at.

The size, relative positioning, coloring, highlighting, transparency and/or other modification to the video 340 is selectably controlled to provide a suitable visual accommodation that enables the viewer 310 to see the signing video 340 while not causing too much of a distraction. As shown in this environment, the planetarium control computing system 350 is displaying the presentation/object(s) and the server 320 selects/synchronizes the video 340 to correspond with the presentation/objects(s) as generally described above.

FIG. 4 illustrates an interpreter 410 providing sign language corresponding to a presentation 440 and a plurality of viewers 420a/420b/420c viewing the presentation. From left to right, the first two viewers 420a and 420b are wearing glasses 430 that enable them to view the transmitted sign language 444a/444b through their glasses while also watching the presentation 440, such as described above.

In some embodiments, the first and second viewers 420a and 420b see the same video 444a/444b of the interpreter 410, but the positioning and orientation of the interpreter is different simply because each of the viewers 420a and 420b has a display device 430 that is oriented differently. As a viewer 420a/420b moves their head, the positioning of the interpreter will move as well, so they can continue to perceive the signing 444a/444b while they view different objects 442a/442b of the presentation 440.

In other embodiments, the first viewer 420a is perceiving a different sign language video (444a) than the second viewer 420b (who is perceiving video 444b) because of the different orientations of their respective display device 430 (viewer 420a is looking at presentation object 442a while viewer 420b is looking at presentation object 442b). In an alternative embodiment, as indicated above, the first and second viewers 420a and 420b see the interpreter 410 differently according to different customized modifications made to each headset 430. The differences can be relative to location, sizing, coloring, transparency or other difference caused by the modifications to the video, based on user defined preferences.

As currently shown, the first and third viewers 420a and 420c are focusing on the same general area/object 442a of the presentation 440. However, only the first viewer is able to perceive the interpreter 410, which appears as an overlay 444a to the presentation object 442a that the third viewer 420c is also seeing. However, since the presentation 440 is not a blended video presentation and since the third viewer 420c is not wearing an appropriate display device 430, the third viewer is unable to see the interpreter video 444a during the presentation. This can be beneficial for the third viewer 420c since the third viewer is not distracted by the signing. While, at the same time, the first and second viewers 420a and 420b (who are hearing impaired) can benefit from the visual accommodation provided by the video overlay 444a/444b without having to split their attention between the presentation objects 442a/442b and the interpreter 410 who is positioned relatively far away from the presentation 440.

The recording, storage and display system environments for providing a sign language video can take on various forms. As illustrated, recording system 450 can film the interpreter 410 in a suitable format for storage on computing system, such as server 460. While recording system 450 is presently shown as being hardwired to server 460, the two systems may also communicate wirelessly. In this regard, it will also be noted that the server 460 can comprise a single stand-alone computer or a distributed computing system. Likewise, the server storage can also be stored on the recording system 450 or other filming device.

As illustrated, server 460 may also include a router, a transmitting device, or any other communication hardware that allows pre-recorded or live streaming sign language video 444a/444b to be transmitted to receiver 470 and further transmitted to display device 430. The receiver can also be integrated into the server 460, such that the receiver 470 is directly connected to the server 460 by wires or other hardware.

It will also be appreciated that while receiver 470 is presently shown as being hardwired to display devices 430, the receiver 470 may also wirelessly communicate with the display devices 430. As described herein, the present invention includes any combination of the foregoing elements or any of the various other features recited in the claims and/or that can be inferred from the drawings.

Computing Environments

Embodiments of the present invention may also comprise or utilize a special-purpose or general-purpose computer system that includes computer hardware, such as, for example, one or more processors and system memory, as discussed in greater detail below, and that can include physical and other computer-readable media for carrying or storing computer-executable instructions and/or data structures. These computer-readable media can be any available media that can be accessed by a general-purpose or special-purpose computer system. Some of these media are physical and relatively non-transitory storage media that store computer-executable instructions and/or data structures. Other computer-readable media are signals or purely transitory carrier waves that merely carry the computer-executable instructions and/or data structures being transmitted therein. Thus, by way of example, and not limitation, embodiments of the invention can comprise at least two distinctly different kinds of computer-readable media: computer storage media and transmission media.

Some examples of physical storage media include recordable-type storage devices, such as RAM, ROM, EEPROM, solid state drives ("SSDs"), flash memory, phase-change memory ("PCM"), optical disk storage, magnetic disk storage, nonvolatile storage, or any other physical hardware storage device which can be used to store program code in the form of computer-executable instructions or data structures, and which can be accessed by a general-purpose or special-purpose computer system. The term storage device, as defined herein, is a hardware device that is distinguished from a carrier wave, signal or other transitory medium.

Examples of transmission media include networks and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media.

Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions, such as those that have been described herein. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, multi-touch devices, tablets, pagers, routers, switches, and the like that have adequate processors, display devices and other hardware that is capable of performing the functionality described herein.

The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for facilitating communication with one or more hearing-impaired viewer, the computing system comprising:
   at least one hardware processor; and
   one or more hardware storage device having stored computer-executable instructions that are executable by the at least one hardware processor, and that configure the system to facilitate communications to one or more user, including computer-executable instructions that configure the computer system to perform at least the following:
      obtain detected focus information associated with a head-mounted device to identify one or more particular items that are viewable by a viewer wearing the head-mounted device;
      obtain video of sign language being signed by a signer, the sign language corresponding to the one or more particular items viewable by the viewer;
      visually enhance the obtained video of sign language with one or more modification in such a manner that a subsequent rendering of the obtained video of sign language will be rendered as a modified video presentation having the one or more modification; and transfer the modified video presentation to one or more display system on the head-mounted device, the display system configured to display the modified video presentation on a display portion of the head-mounted device using optical properties of a transparent material incorporated into the display system, the display system displaying the modified video presentation to a viewer on the display portion simultaneously while the viewer is viewing the one or more particular items corresponding to the sign language of the obtained video, the sign language being displayed concurrently while the one or more particular items are viewable by the viewer through the head-mounted device, so as to enable the viewer to view the sign language from the modified video presentation and the one or more particular items concurrently, wherein positioning of the modified video presentation on the display portion of the head-mounted device is at least partially based on the detected focus information.

2. The computing system of claim 1, wherein the modified video presentation is rendered simultaneously with a different video presentation that includes the one or more items, the modified video presentation and the different video presentation being rendered together as a single blended presentation.

3. The computing system of claim 2, wherein the different video presentation includes audio with spoken words and wherein the modified video presentation and different video presentation are synchronized for display in the blended presentation in such a manner that the sign language is rendered contemporaneously with the spoken words.

4. The computing system of claim 2, also including computer-executable instructions that configure the computer system to blend the modified video presentation with the different video presentation into the blended presentation.

5. The computing system of claim 1, wherein the one or more modification includes cropping or isolating one or more portion of the signer, including at least hands of the signer, from a background captured in the obtained video, such that the blended presentation includes the cropped or isolated one or more portion of the signer blended without at least a portion of the background that was captured in the obtained video.

6. The computing system of claim 5, wherein the one or more modification includes at least one of repositioning or resizing the cropped or isolated one or more portion of the signer within the blended presentation.

7. The computing system of claim 5, wherein the one or more modification includes highlighting the cropped or isolated one or more portion of the signer in the blended presentation.

8. The computing system of claim 7, wherein the one or more modification includes brightening a visual appearance of the cropped or isolated one or more portion of the signer in the blended presentation.

9. The computing system of claim 7, wherein the one or more modification includes adding a background or object to the obtained video in a visually proximate position to the cropped or isolated one or more portion of the signer.

10. The computing system of claim 2, wherein the blended presentation is rendered in substantially real-time during obtaining of the obtained video and such that the modifying and blending is performed on-the-fly as the obtained video is obtained.

11. The computing system of claim 2, wherein at least one of the modified video presentation or the different video presentation comprises a pre-recorded video.

12. The computing system of claim 1, also including computer-executable instructions that configure the computer system to select the video which is obtained in response to the detected focus information, the particular topic of the video corresponding to the one or more items identified by the focus information.

13. The computing system of claim 1, wherein the transparent material is a transparent glass.

14. The computing system of claim 1, wherein the focus information identifies a specific location and orientation of the display system relative to the one or more items.

15. The computing system of claim 1, wherein the focus information identifies a specific location and orientation of the display system relative to the one or more items.

16. The computing system of claim 1, wherein the one or more modification is selected from the group consisting of: changing a brightness, a color, a transparency, a marking, and a highlighting of at least a portion of the signer that is rendered in a blended presentation.

17. A computer program product comprising one or more hardware storage device having stored thereon computer-executable instructions that are executable by at least one processor of a computer system and that configure the computer system to facilitate communications to hearing-impaired users, including computer-executable instructions that configured the computer system to perform at least the following:
obtain video of sign language being signed by a signer, the sign language corresponding to a particular topic;
visually enhance the obtained video of sign language with one or more modification and in such a manner that a subsequent rendering of the obtained video of sign language will be rendered as a modified video presentation having the one or more modification;
obtain detected focus information associated with a head-mounted device to identify one or more particular items that are viewable by the viewer wearing the head-mounted device; and
display, at the head-mounted device, the modified video presentation while the one or more items, which are associated with the particular topic, are viewable to the viewer through a transparent material of the head-mounted device and in such a manner that the sign language is concurrently rendered and perceptible to the viewer while the one or more items are visible to the viewer through the transparent material of the head-mounted device,
wherein the head-mounted device is configured to display the modified video presentation using optical properties of the transparent material on a display portion of the head-mounted device, and wherein position of the modified video presentation on the display portion of the head-mounted device is at least partially based on the detected focus information.

18. A computer-implemented method for facilitating communications to hearing-impaired users, the computer-implemented method comprising:
a computing system obtaining video of sign language being signed by a signer, the sign language corresponding to a particular topic;

the computing system visually enhancing the obtained video of sign language with one or more modification and in such a manner that a subsequent rendering of the obtained video of sign language will be rendered as a modified video presentation having the one or more modification;

obtaining detected focus information associated with a head-mounted device to identify one or more particular items that are viewable by a viewer wearing the head-mounted device;

while the one or more items that are associated with the particular topic are visible to the viewer through a transparent material of the head-mounted device, the computing system causing the head-mounted device to concurrently render at least the sign language from the modified video presentation and in such a manner that the viewer is enabled to simultaneously view the sign language from the modified video and the one or more items associated with the particular topic;

wherein the head-mounted device is configured to display the modified video presentation using optical properties of the transparent material on a display portion of the head-mounted device, and wherein positioning of the modified video presentation on the display portion of the head-mounted device is at least partially based on the detected focus information.

19. The one or more computer storage device as in claim 17, wherein the computer-executable instructions further configure the computer system to perform a process of dynamically adjusting the modified video presentation directly at the display device or with a controller connected to the display device, and wherein the one or more input received by the viewer includes at least one of the following: adjusting the size, brightness, transparency, positioning, coloring, or highlighting of the interpreter relative to other objects being viewed by the viewer.

20. The one or more computer storage device as in claim 19, wherein dynamically adjusting the modified video presentation includes temporal adjustments enabled by trick play functionality, which enables the viewer to fast-forward, rewind, skip, pause, and play the modified video presentation.

* * * * *